United States Patent [19]

Hawley

[11] 4,378,006
[45] Mar. 29, 1983

[54] SOLAR PANEL FOUNDATION DEVICE

[75] Inventor: Wilbur W. Hawley, Northridge, Calif.

[73] Assignee: Atlantic Richfield Company, Los Angeles, Calif.

[21] Appl. No.: 254,717

[22] Filed: Apr. 16, 1981

Related U.S. Application Data

[63] Continuation of Ser. No. 65,809, Aug. 13, 1979, abandoned.

[51] Int. Cl.³ ............................................... F24J 3/02
[52] U.S. Cl. .................................. 126/417; 126/450; 165/68
[58] Field of Search ................... 165/67, 68; 126/417, 126/450, 451, 415

[56] References Cited

U.S. PATENT DOCUMENTS

| 783,377 | 2/1905 | Jennison | 165/68 |
|---|---|---|---|
| 866,429 | 9/1907 | Bunting | 165/68 |
| 1,816,984 | 8/1931 | Miller | 165/68 |
| 2,501,147 | 3/1950 | Tolan | 165/67 |
| 3,366,168 | 1/1968 | Dale | 126/417 |
| 3,934,645 | 1/1976 | Butts | 165/67 |
| 4,044,752 | 8/1977 | Barak | 126/417 |
| 4,172,444 | 10/1979 | Atkinson | 126/450 |
| 4,201,190 | 5/1980 | Bowen | 126/450 |
| 4,226,256 | 10/1980 | Hawley | 126/450 |
| 4,256,091 | 3/1981 | Hallows | 126/450 |

Primary Examiner—Daniel J. O'Connor
Attorney, Agent, or Firm—F. Lindsey Scott

[57] ABSTRACT

A transportable solar panel foundation device which has a bottom member, at least one upstanding side member, and an essentially open top. The side members are angled to permit nesting of a plurality of the foundation devices, and reinforcement pads are carried by the foundation device to support legs for one or more solar panels.

10 Claims, 5 Drawing Figures

SOLAR PANEL FOUNDATION DEVICE

This is a continuation, of application Ser. No. 65,809, filed Aug. 13, 1979, now abandoned.

BACKGROUND OF THE INVENTION

Many locations where solar installations are most useful are very remote, for example, mountain tops and deserts. These varying remote locations also have widely differing engineering requirements for the solar installations.

Accordingly, it would be very useful to have a foundation device which is designed and engineered for supporting one or more solar panels, be they photovoltaic, thermal, combinations thereof, and the like, which foundation devices can be engineered for a nonspecific installation site manufactured at a convenient location and then transported to the remote site in compact form. This way all the engineering and manufacturing can be done away from the remote site and, if desired, part of the assembling can be done in the factory with the remainder being carried out at the remote site.

SUMMARY OF THE INVENTION

According to this invention there is provided a transportable solar panel foundation device which fits the above requirements. The device is composed of a bottom member, at least one upstanding side member with an essentially open top, the bottom and side members defining an open interior cavity. The side member or members are angled to allow nesting of a plurality of the foundation devices in their interior cavities. Reinforcement pads are carried by at least one of the bottom member or side member in order to support legs for the solar panel or panels to be installed on the foundation device either at the factory, other place of assembly, or at the site of operation.

Accordingly, it is an object of this invention to provide a new and improved transportable foundation device for supporting solar panels.

Other aspects, objects and advantages of this invention will be apparent to those skilled in the art from this disclosure and the appended claims.

DETAILED DESCRIPTION OF THE INVENTION

Figure 1:
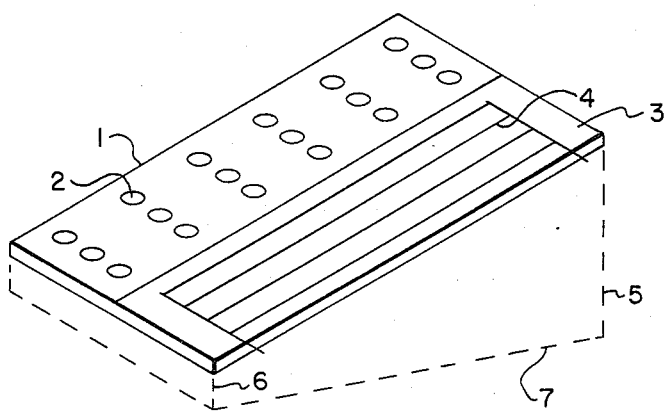
FIG. 1 shows two solar panels which would be supported by the foundation device of this invention.

More specifically, FIG. 1 shows a conventional solar photovoltaic cell panel 1 having a plurality of commercially available photovoltaic cells 2 mounted thereon for the generation of electricity.

FIG. 1 also shows a thermal solar panel 3 which carries a plurality of pipes 4 which conduct a fluid such as liquid water therethrough to be heated by the sun to provide thermal energy as the output of panel 3. Any other type of solar panel can also be employed in this invention in the manner illustrated for panels 1 and 3. The solar panels, when in operation, are tilted to face the sun by way of, for example, legs 5 and 6 which legs are then supported by some sort of foundation device 7.

Figure 2:
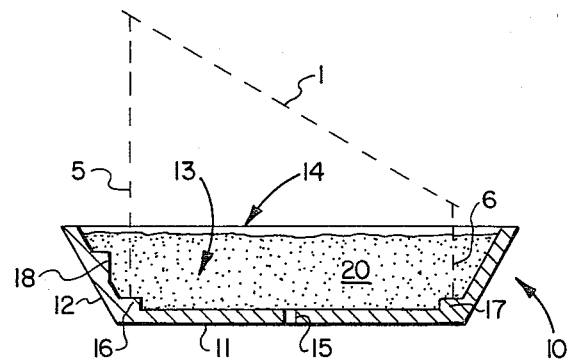
FIG. 2 shows one embodiment of a foundation device within this invention.

FIG. 2 shows a foundation device 10 within this invention which is composed of a bottom member 11 which rests on a supporting surface such as the surface of the earth, a rooftop, or the like. Attached to bottom member 11 is upstanding side member 12 which in the embodiment of FIG. 2 is an essentially circular side member that angles outwardly to permit nesting of a plurality of foundation devices in the interior cavity 13 of the device as will be described in greater detail hereinafter with reference to FIG. 5. Member 12 defines a closed interior cavity 13 which has an open top 14. Bottom member 11 has at least one drain hole 15 therein to allow rainwater and other liquids to drain from interior cavity 13.

Reinforcement pads 16 and 17 are provided as support means for legs 5 and 6. Such reinforcement pads can be carried by the bottom member as shown at 16 and 17 or by the side member as shown at 18 or a combination thereof as desired and necessary for the specific site in which the foundation device 10 is to be located and the particular solar panel or panels to be supported.

Foundation device 10 as formed in the factory will have its interior cavity empty and, preferably, is transported to the site of operation in this condition. At the site of operation, in order to make the foundation device relatively permanent, interior cavity 13 is filled with locally available material 20 such as dirt, sand, rocks, scrap iron, gravel, and the like.

Figure 3:
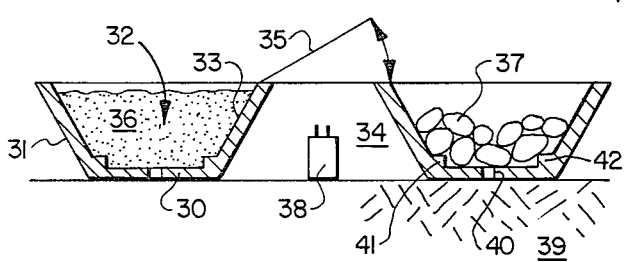
FIG. 3 shows another embodiment of a foundation device within this invention.

FIG. 3 shows an embodiment within this invention wherein bottom member 30 resting on earth 39 has upstanding outwardly angled side member 31 as described heretofore in FIG. 2 hereinabove, and also has in its interior cavity 32 an upstanding inwardly angled circular wall means 33 which defines a sub-interior enclosure 34. Enclosure 34 can be closed off from the weather by removable top means 35 to provide an enclosure physically separate from interior 32 with its dirt 36 and rocks 37. Enclosure 34 can contain equipment such as electrical storage-battery 38 which is normally associated with the particular solar panels the foundation device is to support. For example, if photovoltaic solar panels 1 are supported by the foundation device of FIG. 3, they can be interconnected with battery 38 to provide an electricity storage means which can be drawn upon when the photovoltaic panels are not generating electricity due to cloudy weather and the like.

The foundation device of FIG. 3 also has drain holes 40 in bottom member 30 as well as one or more reinforcement pads 41 and 42 for supporting legs or other support structure of the solar panels to be mounted over the foundation device.

Figure 4:
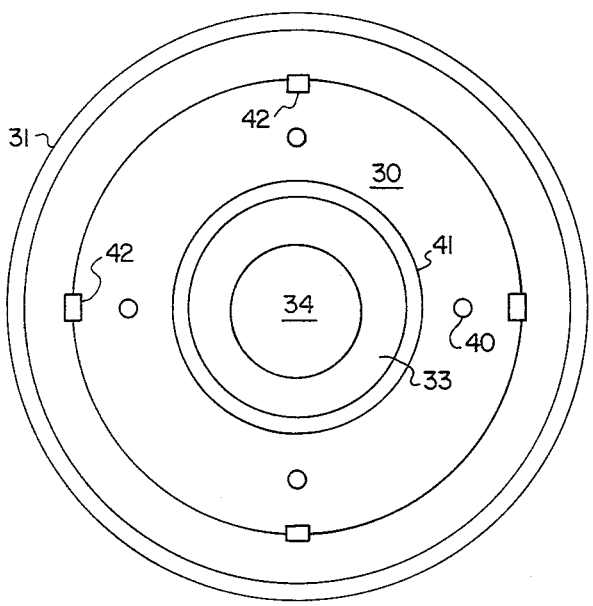
FIG. 4 shows a top view of the embodiment of FIG. 3.

FIG. 4 shows a top view of the foundation device of FIG. 3 with dirt 36, rocks 37 and battery 38 removed for sake of clarity. It can be seen from FIG. 4 that side member 31 and wall means 33 are circular and concentric. Although circular configurations are disclosed, the invention is not to be limited thereto. Square, rectangular, or any other enclosing type surface, curved or angled, or a combination thereof, can be employed in this invention for the outside side members and any all means which define a sub-interior enclosure.

It can also be seen from FIG. 4 that the reinforcement pads in this invention can either be circular as with pad 41 or can be individual localized members spaced apart around the interior cavity as shown for pads 42, or a combination thereof.

Figure 5:
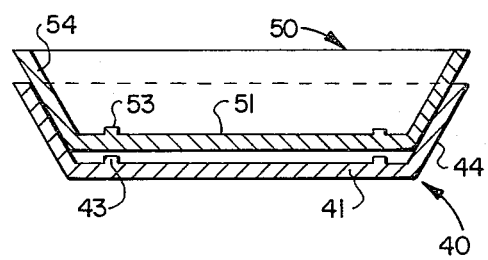
FIG. 5 shows two devices of FIG. 2 in nested position.

FIG. 5 shows two foundation devices in accordance with this invention which are nested together for maximum compactness for storage and transportation to the operating site. FIG. 5 shows bottom device 40 with bottom member 41 which carries a plurality of discrete reinforcement pads 43 along with upstanding and outwardly angled curvilinear side member 44. The interior cavity of foundation device 40 carries in a nested position, a second foundation device 50 similarly constructed with a bottom member 51, individual reinforcement pads 53, and upstanding outwardly angled curvilinear side member 54. Accordingly, the interior cavity volume of the device of this invention, during transportation, storage, and the like, is utilized to contain one or more other devices thereby affecting maximum use of their interior cavities.

The device of this invention can be formed from any desired material, for example, concrete, particularly reinforced concrete. Accordingly, depending on the operating site, numerous other considerations, and the particular material used in constructing the device drain holes such as 15 in FIG. 1 can be optional. For example, when no drain hole is employed, entrapped water will serve as ballast in addition to the dirt, rocks, etc. 20, and can even be a source of cooling water, etc., if desired.

It can be seen that this invention is quite well suited to general installation site engineering at the factory for widely differing operating location requirements. It is also useful for maintaining maximum weight and volume savings for transportation from the factory to the operating site.

Reasonable variations and modifications are possible within the scope of this disclosure without departing from the spirit and scope of this invention.

The embodiments of the invention in which an exclusive property or privilege is claimed are defined as follows:

1. A solar panel apparatus adapted to installation at remote sites; said apparatus including at least one solar panel supported by at least one support leg on a transportable solar panel foundation device, said device comprising a bottom member for resting on a supporting surface, at least one upstanding side member, and an essentially open top, said bottom member and at least one side member thereby defining an open topped, closed interior cavity, said side member being angled to permit nesting of a plurality of said foundation devices in their interior cavities, and reinforcement pads carried by at least one of said bottom member and side member to receive and carry said support legs for said solar panel.

2. A device according to claim 1 wherein said device carries in its interior cavity an enclosure means having upstanding wall means which define a sub-interior enclosure, the upstanding wall means of said enclosure means also being angled to permit nesting of a plurality of said foundation devices.

3. A device according to claim 2 wherein said enclosure means has a removable top means so that said sub-interior enclosure can be closed off from the weather.

4. A device according to claim 2 wherein said at least one side member angles outwardly and said wall means angles inwardly.

5. A device according to claim 4 wherein said side members and wall means are circular and concentric.

6. A device according to claim 5 wherein said reinforcement pads are continuously circular and extend around the inner surface of said at least one side member and around the outer surface of said wall means.

7. A device according to claim 5 wherein said reinforcement pads are individual localized members spaced apart in said interior cavity.

8. A device according to claim 5 wherein said reinforcement pads are a combination of continuously circular members and individual localized spaced apart members.

9. A device according to claim 1 wherein said at least one side member angles outwardly.

10. A device according to claim 1 wherein said bottom member has at least one drain hole therein.

* * * * *